US 9,697,528 B2

(12) United States Patent
Ahmed et al.

(10) Patent No.: US 9,697,528 B2
(45) Date of Patent: Jul. 4, 2017

(54) TRACKING INTERACTIONS WITH FORWARDED LINKS BY EVALUATING SIMILARITY OF FORWARDED LINKS AND EVALUATING A CHAIN OF FORWARDING

(75) Inventors: Maryam Ahmed, Vaughan (CA); Al Chakra, Apex, NC (US); Matthew C. Hillary, Tyler, TX (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 13/532,060

(22) Filed: Jun. 25, 2012

(65) Prior Publication Data

US 2013/0346841 A1    Dec. 26, 2013

(51) Int. Cl.
*G06F 17/00* (2006.01)
*G06Q 30/02* (2012.01)
*H04L 29/08* (2006.01)
*G06F 11/30* (2006.01)

(52) U.S. Cl.
CPC ..... *G06Q 30/0201* (2013.01); *G06F 11/3006* (2013.01); *H04L 67/146* (2013.01); *H04L 67/22* (2013.01)

(58) Field of Classification Search
CPC ........... G06F 17/30887; G06F 17/3089; G06F 17/30896; G06F 17/2235
USPC ....................... 715/208, 206, 319
See application file for complete search history.

(56) References Cited

U.S. PATENT DOCUMENTS

| 7,827,166 | B2 | 11/2010 | Garg et al. | |
|---|---|---|---|---|
| 2008/0256233 | A1* | 10/2008 | Hall et al. | 709/224 |
| 2009/0282052 | A1* | 11/2009 | Evans et al. | 707/10 |
| 2010/0145956 | A1* | 6/2010 | Shi et al. | 707/754 |
| 2011/0239103 | A1 | 9/2011 | Mercuri | |
| 2011/0313833 | A1* | 12/2011 | Graepel et al. | 705/14.16 |
| 2011/0320715 | A1* | 12/2011 | Ickman et al. | 711/118 |
| 2012/0023390 | A1* | 1/2012 | Howes et al. | 715/205 |
| 2012/0324008 | A1* | 12/2012 | Werz et al. | 709/204 |

OTHER PUBLICATIONS

International Search Report and Written Opinion dated Aug. 9, 2013 for International Application No. PCT/EP2013/060326, 9 pages.

(Continued)

*Primary Examiner* — Scott Baderman
*Assistant Examiner* — Matthew G McVicker
(74) *Attorney, Agent, or Firm* — Stephen J. Walder, Jr.; Joseph Petrokaitis (57) ABSTRACT

Mechanisms are provided for tracking link sharing in a messaging environment of a data processing system. Message information is received that identifies a plurality of links to content included in one or more messages exchanged via the data processing system. A relationship measure is determined based on the message information. The relationship measure measures a likelihood that a first link is related to a second link in the plurality of links and points to a same source of content. An association data structure associating the first link with the second link is generated based on the relationship measure. User interactions with the first link and the second link are tracked based on the generated association data structure.

22 Claims, 3 Drawing Sheets

(56) References Cited

OTHER PUBLICATIONS

"301works.org, Frequently Asked Questions", Jul. 22, 2010, XP055071800, Retrieved from the Internet: URL: http://archive.org/details/301works-faq [retrieved on Jul. 17, 2013], 1 page.

"Using URL shortening services to improve search results", IP.com, Disclosure No. IPCOM000188228D, http://ip.com/IPCOM/000188228, Sep. 28, 2009, 1 page.

* cited by examiner

TRACKING INTERACTIONS WITH FORWARDED LINKS BY EVALUATING SIMILARITY OF FORWARDED LINKS AND EVALUATING A CHAIN OF FORWARDING

BACKGROUND

The present application relates generally to an improved data processing apparatus and method and more specifically to mechanisms for tracking interactions with a shared link through a chain of forwarding.

Many times when a user encounters content of interest, the user may choose to forward the link to other users that he/she believes would also find the content of interest to them. The link, e.g., the uniform resource locator (URL), when it is forwarded, will be associated with the user forwarding the link. Thus, any metrics regarding interactions with the forwarded link will be associated with the user that forwarded the link. For example, if user A forwards a link to user B, user B's interaction with the link, e.g., a click-thru operation (i.e. a clicking of the link followed by navigation to the corresponding web site or content associated with the link), or the like, will be used as the basis for metrics collected for user A's forwarding of the link. However, if user B then forwards the link on to users C, D, and E, if any of these users perform an interaction with the link forward by user B, then the interactions by those users will be associated with the forwarding of the link by user B for purposes of generating metrics but will not be associated with user A.

This is especially true when users make use of URL shortening services to permit them to forward long URL links in social media environments for example. That is, because many social media environments put limits on the length of messages that may be transmitted, it sometimes becomes difficult to forward URL links of interest if the URL link has a length that takes up most of the allowed length of messages within the social environment. As a result, URL shortening services are utilized that, through various methods, shorten the URL to a much shorter length and store an association of the shortened URL with the original full length URL. When a user clicks on the shortened URL, the corresponding request for the content associated with the shortened URL is transmitted to the URL shortening services web site which correlates the shortened URL with the full length URL and then performs a redirect of the request to the content corresponding to the full length URL.

Often times, a user of a social media service may use a URL shortening service to generate a shortened URL that is forwarded to one or more other users via the social media service. The recipients of the shortened URL may themselves use a URL shortening service, either the same or a different one, to generate yet another shortened URL which may be forwarded along. Thus, once again, any interactions with the first shortened URL will be associated with the first user while interactions with the second shortened URL will be associated with the second user. Especially in social media environments, it is important to users to be able to track the impact of their social presence/activity. However, because of the disconnect between the shortened URLs, the social presence/activity corresponding to the original forwarded of the URL, i.e. the first user, may not be accurately reflected in metrics maintained for the user.

SUMMARY

In one illustrative embodiment, a method, in a data processing system comprising at least one processor and at least one memory, for tracking link sharing in a messaging environment of the data processing system. The method comprises receiving, in the data processing system, message information. The message information identifies a plurality of links to content included in one or more messages exchanged via the data processing system. The method further comprises determining, by the data processing system, a relationship measure that measures a likelihood that a first link in the plurality of links is related to a second link in the plurality of links and points to a same source of content. The method further comprises generating, by the data processing system, an association data structure associating the first link with the second link based on the relationship measure. The method also comprises tracking, by the data processing system, user interactions with the first link and the second link based on the generated association data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for tracking interactions with a shared link through a chain of forwarding. That is, the illustrative embodiments provide mechanisms to track the origin and migration of links, and in some illustrative embodiments shortened links, across distributed data processing networks by using link sharing probability determinations to create associations between these links. Because the mechanisms of the illustrative embodiments are especially useful with regard to shortened links, such as shortened URLs generated by URL shortening services, the following illustrative embodiments will be described with regard to such shortened links. However, it should be appreciated that the illustrative embodiments are not limited to such and can be applied to forwarding of links that have not been shortened.

The illustrative embodiments provide mechanisms for determining the probability that a second user who shares a link with other users, or utilizes a shared link, in fact obtained the link from another particular user who previously shared the link. This probability determination may be performed at each stage of a chain of forwarding of the link such that the probability determination can be used to identify the chain of forwarding of the link from one user to another. The probability value may be based on various factors such as a user's association with other users that are forwarding the link (i.e. a degree of separation), a frequency of other users sharing other links forwarded by the present user, a time between other users forwarding a corresponding link and an original forwarding of the link by the present user, and the like.

Associations between forwardings of links by various users may be stored in the tracking system of the illustrative embodiments for later use in generating interaction metrics and statistics. For example, an association between user A, user B, and user C may be generated based on the results of calculating probabilities in accordance with the illustrative embodiments to determine if the probability that user C obtained the link from user B is above a predetermined threshold, and if the probability that user B obtained the link from user A is above the predetermined threshold. Assuming such is the case, an association between user A, user B, and user C may be established with regard to the link in question, and this association may be stored and used to track interactions with the link. As a result, if user C performs a click-thru operation on the link, not only will this interaction be associated with user B's forwarding of the link, but also with user A's forwarding of the link so that user A is able to obtain a more accurate metric/statistical representation of user A's social presence/activity within the particular environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
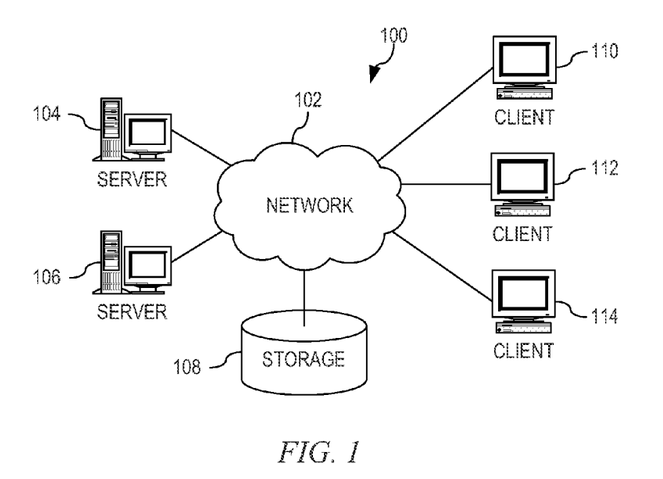
FIG. 1 is an example diagram of a distributed data processing system in which aspects of the illustrative embodiments may be implemented.
Figure 2:
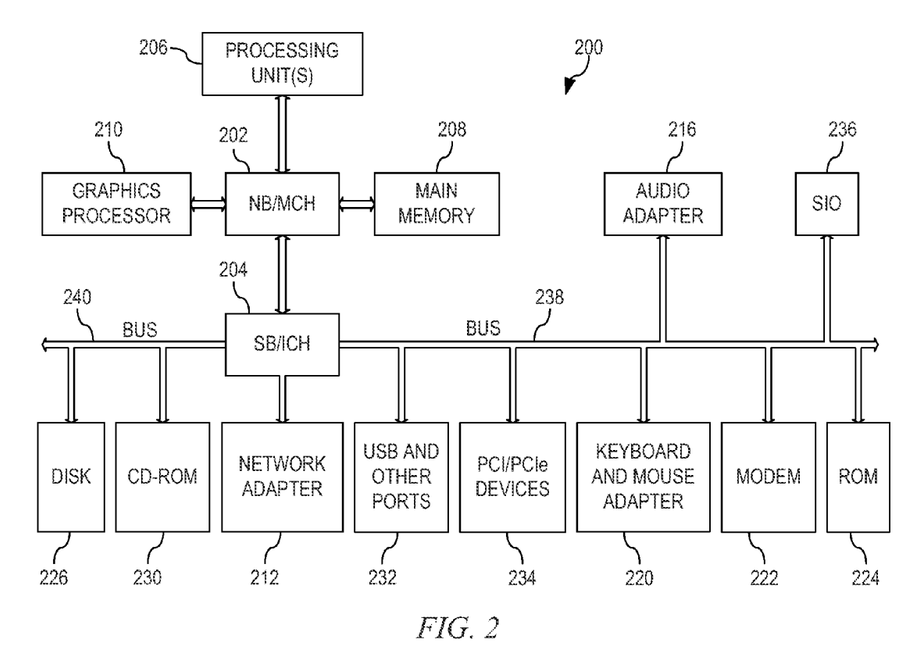
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, compact disc-read only memory (CD-ROM drive) 230, universal serial bus (USB) ports and other communication ports 232, and PCI/PCIe devices 234 connect to SB/ICH 204 through bus 238 and bus 240. Peripheral Component Interconnect (PCI)/PCI Express (PCIe) devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As discussed above, for purposes of the following description, it will be assumed that the present invention is implemented for the purpose of tracking and associating the forwarding of shortened links, and in particular shortened Uniform Resource Locators (URLs), in a social networking environment, such as Facebook™, Twitter™, or the like. However, as also noted above, this is not a requirement and instead the illustrative embodiments may be utilized with any forwarding of a link, whether shortened or not, without departing from the spirit and scope of the illustrative embodiments.

In the context of a social networking environment and the use of shortened URLs within this social networking environment, referring again to FIG. 1, one or more servers 104, 106 may provide social networking services, while others of the servers 104, 106 or servers not specifically depicted in FIG. 1 but otherwise associated with a data network 102, may provide a link shortening service, as is generally known in the art. That is, social networking services provide various processes, user interfaces, and the like, through which registered users may exchange communicates and content with one another in a distributed manner using their various client computing devices 110-114 to access these services. The link shortening service provides processes and interfaces through which a user, application, or the like, may request the shortening of a link such that the shortened link may be utilized and mapped to the full length link via the link shortening service and the mapping data maintained by the link shortening service. The manner by which the link shortening service performs the actual shortening of the link is implementation dependent and may involve any of a number of different methodologies including, for example, using hash functions and hash values to represent the full link as a shortened link with the hash value being used in a hash lookup table to map the hash value to the full length link.

As mentioned above, within the social networking environment generated by the social network services, it is often desirable for users of the social network environment to obtain metrics for determining the influence within the social network. For example, when a user sends a message containing a link, "retweets" another user's link using the Twitter social networking service, performs a hashtag re-use, comments, @replies, "likes" or "dislikes" on the Facebook social networking service, or posts a link on a message board of the social network environment, etc., to content such as a web page, multimedia content, or the like, the user may wish to know how often other users click on the link to access the content, indicate that they like the link, indicate that they dislike the link, or the like. In such a case, the link is referred to herein as a "forwarded" link. These user interactions with the forwarded link are generally referred to as "click-thrus" since the interaction involves a clicking of the link which causes the user to go through to the source of the content and access the content associated with the link.

Such tracking of user interactions with forwarded links may be tracked by the social network service for links directly forwarded by the first user to one or more second users when the second users click or otherwise perform a user interaction with the forwarded link in the message or post that the user generated. This tracking may be used to generate metrics of user interactions with the forwarded link that may be stored in association with the first user and the link. From these metrics, statistics of the user's relative contribution or influence in the social network may be generated. For example, these statistics may represent how often users in the social network click on links forwarded by the first user, how often the first user's forwarded links are liked by other users or disliked by other users, or other types of statistical representations of the tracked metrics.

A problem arises, however, when one or more of the second users decides to again forward the forwarded link to other third users. This is especially true if the second user uses a link shortening service to forward the forwarded link on to third users and especially true if the first user used the same or a different link shortening service to forward the original forwarded link. That is, when the second user uses a link shortening service to shorten the link, it will not resemble the originally forwarded link due to the shortening and thus, a direct comparison of links to see if they are the same link is not possible. As a result of the forwarding of the link, any user interactions with the second forwarded link by third users will be able to be tracked back to the second user that performed the second forwarding of the link but not back to the original user that forwarded the link to the second user. In the case of link shortening, the first forwarded link and the second forwarded link will not directly resemble each other and thus, it will be difficult for one to draw a correlation between the two forwarded links.

The illustrative embodiments provide such a mechanism for correlating forwarded links so that all forwarders of a link in a chain of forwarding may be associated with the metrics collected for the use of the link. These metrics are attributed backwards in the chain so that the first forwarder of the link is associated with all of the metrics collected for the link whereas second forwarders are only associated with metrics corresponding to user interactions with the second forwarded link and thereafter, e.g., third, fourth forwarded link, etc. The illustrative embodiments correlate forwarded links based on a probability calculation that calculates the probability that a forwarded link corresponds to another forwarded link. This probability calculation takes into account various factors representative of the likelihood of a correlation between forwarded links. Such factors may include, for example, the degree of separation of the users forwarding the links, a frequency that one user forwards links sent or posted by another user, a time between one forwarding of the link and another forwarding of the link, etc. The metrics collected using the mechanisms of the illustrative embodiments, for links forwarded from one user to another may be stored and used to generate the statistics for use in measuring the user's impact or influence within the particular social network.

The mechanisms of the illustrative embodiments may be implemented within the data processing systems of the social network, e.g., within servers 104, 106, or by an external system, such as a search engine, web crawler system, or the like. With regard to an internal mechanism of the social network, the tracking of links using the illustrative embodiments may be performed dynamically as messages having forwarded links are sent/posted using the social network systems. With regard to an external mechanism, such tracking may be done periodically on logs of messages sent between users, or posted, in the social network using the social network systems. Of course, the internal mechanisms may also use a periodic tracking based on logs as well, and the external mechanisms, in some cases, may be able to utilize dynamic tracking of messages if access is given to such external mechanisms by the internal systems of the social network.

Figure 3:
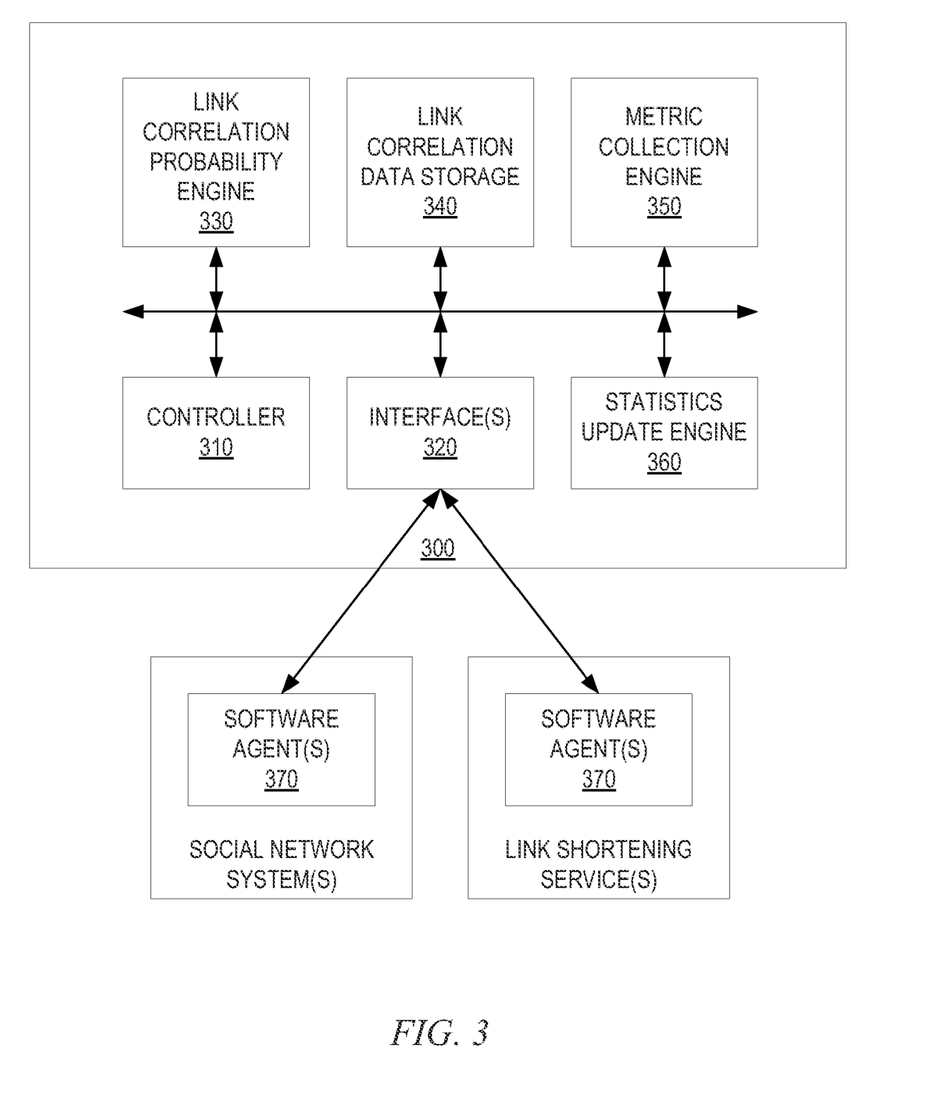
FIG. 3 is an example block diagram of the primary operational elements of a shared link forwarding tracking mechanism in accordance with one illustrative embodiment.

FIG. 3 is an example block diagram of the primary operational elements of a shared link forwarding tracking mechanism in accordance with one illustrative embodiment. The elements shown in FIG. 3 may be implemented as software, hardware, or any combination of software and hardware. In one illustrative embodiment, the elements of FIG. 3 are implemented as software instructions loaded into one or more memories and executed by one or more processors of one or more data processing systems. In another illustrative embodiment, one or more of the elements of FIG. 3 may be implemented as circuitry, firmware, or the like. For purposes of the present description, it will be assumed that the elements of FIG. 3 are implemented as software instructions loaded into a memory and executed by a processor.

As shown in FIG. 3, the shared link forwarding tracking mechanism 300 of the illustrative embodiments comprises a controller 310, an interface 320, a link correlation probability engine 330, a link correlation data storage 340, metric collection engine 350, and statistics update engine 360. The controller 310 controls the overall operation of the shared link forwarding tracking mechanism 300 and orchestrates the operation of the other elements 320-360. The interface 320 provides a communication pathway through which the shared link forwarding tracking mechanism 300 may access social network systems to obtain information regarding forwarded links, access link shortening information from link shortening services, provide results of the processing of the shared link forwarding tracking mechanism to other systems, and perform other communication operations to either obtain data from or provide data to other applications, data processing systems, or the like.

The link correlation probability engine 330 receives as input from link forwarding sources, e.g., social network systems, link shortening services, and the like, and analyzes the input to determine a probability that the forwarding of a link in a message by one user is related to the forwarding of a similar link in another message, where the message may be an actual electronic message transmitted from one user to another, a posting to a web server message board, or the like. For example, software agents 370 may be installed in social networking systems that monitor the messages being sent between users or being posted on message boards, or the like, and determines if these messages have any embedded links in them. If so, the information may be provided to the shared link forwarding tracking mechanism 300 via the interface 320. Alternatively, these software agents 370 may periodically retrieve and forward message logs to the shared link forwarding tracking mechanism 300 for analysis.

Of course other mechanisms may be used to collect information about forwarded links without departing from the spirit and scope of the illustrative embodiments. For example, another mechanism that may be utilized is for search engine to have embedded software, a plug-in module, or the like, to accumulate the data when indexing links in posts and then analyze the social network or data the search engine previously obtained for a link to determine the time between posts, relationships between users, frequency of reposts from the originating user, etc.

The link correlation probability engine 330 receives the input data, such as from the software agents 370, and performs one or more probability calculations to determine the likelihood that one forwarded link is the same as another forwarded link. The particular links, messages, and user information upon which to perform this probability calculation may be determined by looking at the input and identifying messages having links that are sent between particular users who also send links out to other users. Thus, for example, if user A sends out a message with a link to users B, C, and D, but only user B sends out another message to users E and F that includes an embedded link, then it is only the link and message of user B and the link and message of user A that are used as input to the probability calculation.

Based on the results of the probability calculations and determination, a correlation or non-correlation is determined. If a correlation is determined between one link and another then an association between the two links is generated and stored in the link correlation data storage 340.

The probability calculations and determinations performed by the link correlation probability engine 330 may take many different forms depending upon the particular implementation. In one illustrative embodiment, the probability calculation is based various factors including, a degree of similarity in the links themselves, e.g., character string comparison, a degree of separation between the users that generated the messages having the links being analyzed, the amount of time elapsed between the sending/posting of the messages, and a frequency of the latter message user forwarding links received from the earlier message user. Based on this calculation, a probability value is determined that one link is the same as another link. If this probability value is equal to or higher than a predetermined threshold value, then it is determined that there is a correlation between the two links and an association between the two links is generated and stored in the link correlation data storage 340.

The associations between links are utilized by the metric collection engine 350 to collect metrics for the links. The metric collection engine 350 also analyzes the input received, such as from the software agents 370, and attributes metrics for user interactions with the links. The metric collection engine 350 further performs a lookup operation in the link correlation data storage 340 for any links for which metrics are being collected and determines if any associations are currently present. If so, then the metric collection engine 350 goes backward in the chain of associations and attributes the same metric to the other associated links. Thus, for example, if a user clicks on a first link and generates a click-thru metric for the first link, and the first link is determined to have an association with another second link that is earlier in the chain of associations, then the second link will be given the same metric for the click-thru as well, i.e. both links' click-thru metrics will be incremented. Such attributing of metrics may continue down the chain of associations to a first link in the chain of associations. These metrics may be stored in entries of the link correlation data storage 340 in association with the links.

The statistics update engine 360 may operate based on the metrics collected by the metrics collection engine 350 and stored in the link correlation data storage 340, to update statistics for users of the social network systems via interface 320. That is, the metrics for each of the links in the link correlation data storage 340 may be transmitted to the social network systems to update the statistics associated with the particular users that forwarded the links. As a result, users are able to obtain credit for the forwarding of their links even if the subsequently forwarded link is modified in some manner, such as by way of a link shortening service or the like.

To better understand the operation of the shared link forwarding tracking mechanism 300, consider a scenario such as the following. User A uses a link shortening service X to shorten a URL to create a shortened link http://aaa.co/bbbbb which user A then posts to a social networking site. The timestamp of user A's posting to the social network is stored. User B follows user A on the same social networking site where the http://aaa.co/bbbbb link was posted. User B clicks on the link posted by User A and determines to forward the link but shortens the link using a link shortening service Y to generate a shortened link http://zzz.co/yyyyy. User B's forwarding of the link is accomplished by also posting a message to the social network system, or a different social network system. A timestamp is associated with user B's posting of the second shortened link.

This information is obtained by the shared link forwarding tracking mechanism 300 via the software agents 370 and the interface 320. The shared link forwarding tracking mechanism 300 identifies the two messages having links from the information received and provides input information to the link correlation probability engine 330. The link correlation probability engine 330 calculates a probability value to determine the likelihood that User B clicked on User A's link before reposting the link, i.e. that the second link http://zzz.co/yyyyy is associated with the first link http://aaa.co/bbbbb.

In one illustrative embodiment, this probability calculation uses a formula such as $P=f*(1/d)*(1/x)$ where:

P is the probability that User B shortened and posted a link that was originally posted by User A;

d is the degree of separation between User A and User B, where the degree of separation is a measure of the connections between users (e.g., if User A has indicated User B to be a friend, then there is one degree of separation, if User A is a friend with User C and user C is a friend of User B, then User B is two degrees of separation from User A, and so on);

x is an amount of time, e.g., in milliseconds, seconds, etc., between User A's posting of the first shortened URL and User B's posting of the second shortened URL; and f is the frequency that User B reshortens other users' URLs or even specifically User A's posts, such as a percentage of the number of User B's reshortened URL posts out of a total number of User B's posts. The frequency value may be obtained by analyzing existing posts to the social network and determining an average factor of User B's posts with regard to links posted by all other users. Alternatively, this frequency value may be generated uniquely for each separate other user based on how many identical source URLs in source posts are identified.

The above probability calculation generates a probability value that may then be compared to a threshold value and if the probability value is equal to or greater than the threshold value, an association is determined to exist between the first shortened URL http://aaa.co/bbbbb and shortened URL http://zzz.co/yyyyy. It should be appreciated that the probability function for performing the probability calculations may be modified in various ways without departing from the spirit and scope of the illustrative embodiments. For example, various parameters of the function may be diluted/amplified as necessary for the particular implementation, e.g., $P=f*sqrt(1/d)*(1/x)^2$ which dilutes the degree of separation factor but amplifies the time factor.

The association between shortened URL http://aaa.co/bbbbb and shortened URL http://zzz.co/yyyyy may be stored in the link correlation data storage 340. Thereafter, if User C clicks on User B's posting of the second shortened URL http://zzz.co/yyyyy as may be determined from logs or information forwarded by software agents 370, for example, the association between the shortened URLs is identified by the metric collection engine 350 in the link correlation probability engine 330. As a result, the click-thru associated with the second shortened URL http://zzz.co/yyyyy is also attributed to the first shortened URL http://aaa.co/bbbbb. Thus, the increase in a corresponding click-thru value, or counter, may be made to both a click-thru value/counter for the second shortened URL and the first shortened URL in a metrics data structure maintained by the metric collection engine 350, for example. These metric values may be used by the statistics update engine 360 to update the user statistics for User A and User B within the social networking system.

Thus, with the illustrative embodiments, an automated mechanism is provided for associating forwarded links with each other so that metrics associated with these links may be correlated and used to update statistics associated with user interactions with the links and users forwarding these links. The illustrative embodiments are especially well suited for use with links that are modified in some manner but still are associated with the same source content. For example, the illustrative embodiments work well with link shortening services in which one user performs a link shortening operation on an original link, and one or more second users use a same or different link shortening service on the first shortened link to generate one or more second shortened links. In such situations, it may be difficult to readily determine that the second shortened links correlate with the first shortened link, however the illustrative embodiments provide a mechanism for making such correlations and storing associations between such links.

Figure 4:
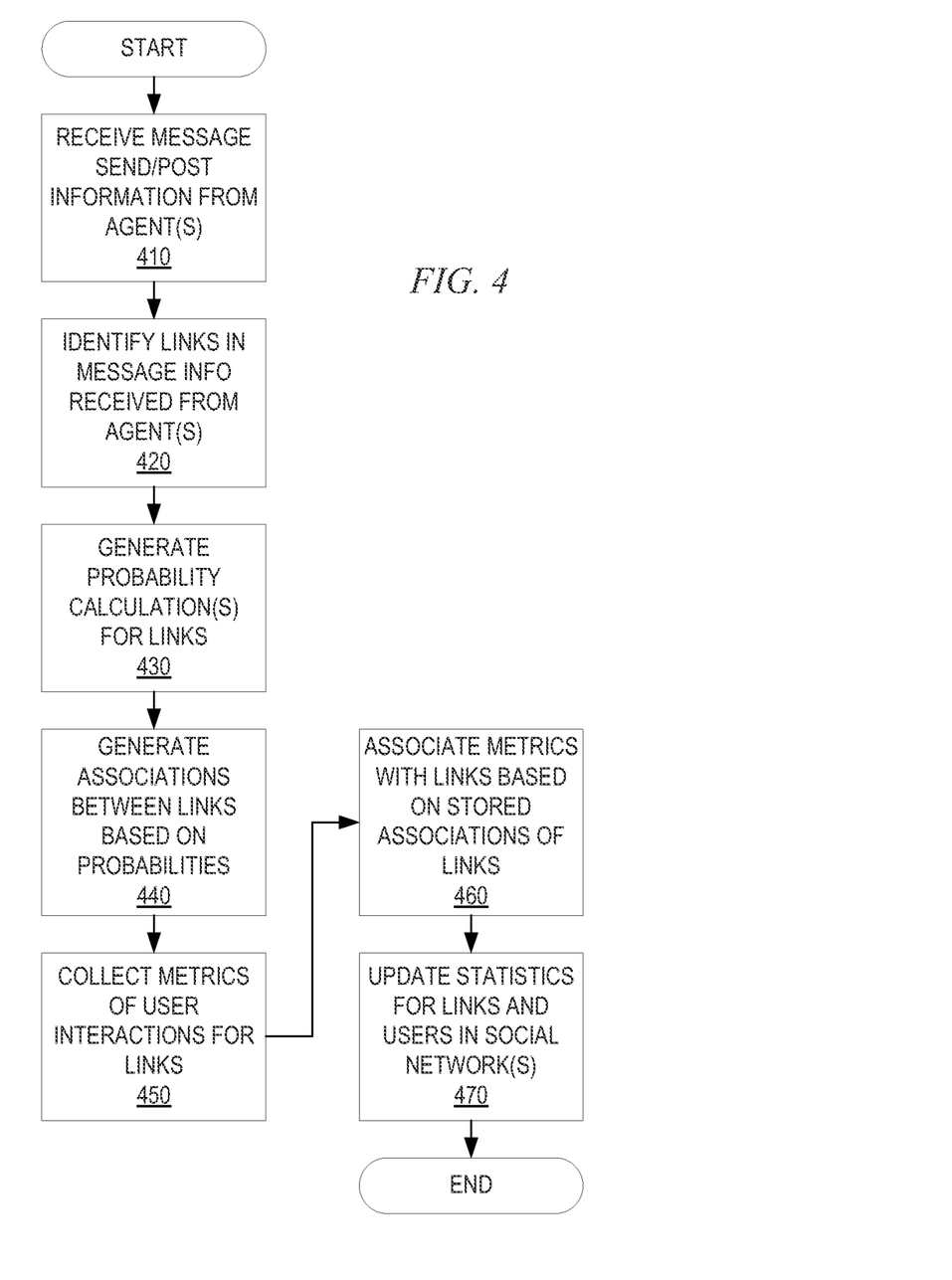
FIG. 4 is a flowchart outlining an example operation for determining a relationship between users forwarding links in accordance with one illustrative embodiment.

FIG. 4 is a flowchart outlining an example operation for determining a relationship between users forwarding links in accordance with one illustrative embodiment. The operation outlined in FIG. 4 may be implemented, for example, by a shared link forwarding tracking mechanism 300.

As shown in FIG. 4, the operation starts by receiving message sending/posting information from one or more software agents (step 410). The software agents may provide information from a social network and/or a link shortening service, for example. The message sending/posting information identifies activities of users with regard to sending/position of messages with links, activities associated with users using link shortening services to generate shortened links including the original link that is shortened and the resulting shortened link. In addition, the message information may further identify the users sending/posting the messages as well as their associations, e.g., friend relationships within the social network.

Links in posted/sent messages are identified form the received information (step 420) and probability calculations between pairs of links, or groups of links in excess of two links, are performed to generate probability values that the links are associated with one another (step 430). The probability calculations may be based on comparisons of the links themselves as well as information from the social network system, such as timestamps of sending/posting of the messages having the links, relationships between users and thus, degrees of separation of the users, frequencies at which users resent/repost links received from other users, etc. From these probability calculations, associations between links are generated and stored (step 440). Thereafter, metrics are collected for user interactions with the various links (step 450) and the metrics are attributed and stored with links based on the stored associations (step 460). The stored metrics are then used to update link and user statistics in the social network systems (step 470). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one processor and at least one memory, for tracking link sharing in a messaging environment of the data processing system, comprising:
   receiving, in the data processing system, first message information for a first message exchanged by a first user via the data processing system, wherein the first message information identifies a first link to content included in the first message;
   receiving, in the data processing system, second message information for a second message exchanged by a second user via the data processing system, wherein the second message information identifies a second link, different from the first link, included in the second message;
   calculating, by the data processing system, a relationship measure that measures a likelihood that the second link is related to the first link and points to a same source of content as the first link at least by calculating a probability value based on a level of similarity of the first link to the second link, wherein the probability value indicates a probability that the second link is a modified form of the first link and points to the same source of content;
   generating, by the data processing system, an association data structure associating the first link with the second link based on the relationship measure meeting a predetermined criterion; and
   tracking, by the data processing system, user interactions with the first link and the second link based on the generated association data structure, wherein calculating the probability value comprises calculating the probability value as a function of the determined level of similarity of the first link to the second link and a determined level of relationship between the first user and the second user.

2. The method of claim 1, wherein generating the association data structure associating the first link with the second link based on the relationship measure is performed in response to determining that the probability value is equal to or greater than a predetermined threshold probability value.

3. The method of claim 1, wherein calculating the probability value comprises calculating a probability that the second link is a shortened form of the first link that is generated from the first link using a link shortening service.

4. The method of claim 1, wherein determining a relationship measure comprises determining whether the first link is a forwarded form of the second link that is generated from the second link.

5. The method of claim 1, wherein the first message information and second message information is received from at least one social networking environment computing device of a social network, and wherein the first and second links are Uniform Resource Locators (URLs) embedded in the first and second messages, respectively, exchanged via the at least one social networking environment computing device.

6. The method of claim 5, further comprising:
determining a first relative influence measure of the first user providing the first link and a second relative influence measure of the second user providing the second link based on the tracking of user interactions with the first link and the second link, wherein the first relative influence measure and the second relative influence measure represent a relative influence of the first user and second user, respectively, within the social network.

7. The method of claim 1, wherein tracking user interactions with the first link and second link based on the generated association data structure comprises updating a user interaction measure value associated with entries for both the first user that provided the first link and the second user that provided the second link in response to a user interaction being performed on the second link.

8. The method of claim 1, wherein tracking user interactions with the first link and the second link based on the generated association data structure comprises tracking click-thru user interactions based on the association data structure and updating click-thru measure values associated with entries for both the first user that sent the first link and the second user that sent the second link in response to a click-thru user interaction being performed on the second link.

9. The method of claim 1, wherein calculating the probability value comprises calculating the probability value as a function of at least two characteristics selected from the following:
results of a character string comparison between the first link and the second link, a degree of separation between the first user and the second user, an amount of time elapsed between submission of the first message and submission of the second message, and a frequency of the second user forwarding links in messages received from the first user.

10. The method of claim 1, wherein tracking user interactions with the first link and the second link based on the generated association data structure comprises:
generating first statistic values associated with first user interactions with the first link;
generating second statistic values associated with second user interactions with the second link or second user interactions with associated subsequent links generated from the second link;
generating a first user statistic value, associated with the first user, based on a combination of the first statistic values and second statistic values;
generating a second user statistic value, associated with the second user, based on the second statistic values but not the first statistic values;
storing the first user statistic value in association with an identifier of the first user in the data processing system; and
storing the second user statistic value in association with an identifier of the second user in the data processing system.

11. A computer program product comprising a non-transitory computer readable medium having a computer readable program stored therein, wherein the computer readable program, when executed in a data processing system, causes the data processing system to:
receive first message information for a first message exchanged by a first user via the data processing system, wherein the first message information identifies a first link to content included in the first message;
receive second message information for a second message exchanged by a second user via the data processing system, wherein the second message information identifies a second link, different from the first link, included in the second message;
calculate a relationship measure that measures a likelihood that the second link is related to the first link and points to a same source of content as the first link at least by calculating a probability value based on a level of similarity of the first link to the second link, wherein the probability value indicates a probability that the second link is a modified form of the first link and points to the same source of content;
generate an association data structure associating the first link with the second link based on the relationship measure meeting a predetermined criterion; and
track user interactions with the first link and the second link based on the generated association data structure, wherein the computer readable program causes the data processing system to calculate the probability value as a function of the determined level of similarity of the first link to the second link and a determined level of relationship between the first user and the second user.

12. The computer program product of claim 11, wherein the computer readable program causes the data processing system to generate the association data structure associating the first link with the second link based on the relationship measure in response to determining that the probability value is equal to or greater than a predetermined threshold probability value.

13. The computer program product of claim 11, wherein the computer readable program causes the data processing system to calculate the probability value by calculating a probability that the second link is a shortened form of the first link that is generated from the first link using a link shortening service.

14. The computer program product of claim 11, wherein the computer readable program causes the data processing system to determine a relationship measure by determining whether the first link is a forwarded form of the second link that is generated from the second link.

15. The computer program product of claim 11, wherein the first message information and second message information is received from at least one social networking environment computing device of a social network, and wherein the first and second links are Uniform Resource Locators (URLs) embedded in the first and second messages, respectively, exchanged via the at least one social networking environment computing device.

16. The computer program product of claim 15, wherein the computer readable program further causes the data processing system to:
determine a first relative influence measure of the first user providing the first link and a second relative influence measure of the second user providing the second link based on the tracking of user interactions with the first link and the second link, wherein the first relative influence measure and the second relative influence measure represent a relative influence of the first user and second user, respectively, within the social network.

17. The computer program product of claim 11, wherein the computer readable program causes the data processing system to track user interactions with the first link and second link based on the generated association data structure by updating a user interaction measure value associated with entries for both the first user that provided the first link and the second user that provided the second link in response to a user interaction being performed on the second link.

18. The computer program product of claim 11, wherein the computer readable program causes the data processing system to track user interactions with the first link and the second link based on the generated association data structure by tracking click-thru user interactions based on the association data structure and updating click-thru measure values associated with entries for both the first user that sent the first link and the second user that sent the second link in response to a click-thru user interaction being performed on the second link.

19. An apparatus, comprising:
a processor; and
a memory coupled to the processor, wherein the memory comprises instructions which, when executed by the processor, cause the processor to:
receive first message information for a first message exchanged by a first user via the data processing system, wherein the first message information identifies a first link to content included in the first message;
receive second message information for a second message exchanged by a second user via the data processing system, wherein the second message information identifies a second link, different from the first link, included in the second message;
calculate a relationship measure that measures a likelihood that the second link is related to the first link and points to a same source of content as the first link at least by calculating a probability value based on a level of similarity of the first link to the second link, wherein the probability value indicates a probability that the second link is a modified form of the first link and points to the same source of content;
generate an association data structure associating the first link with the second link based on the relationship measure meeting a predetermined criterion; and
track user interactions with the first link and the second link based on the generated association data structure, wherein the instructions cause the processor to calculate the probability value as a function of the determined level of similarity of the first link to the second link and a determined level of relationship between the first user and the second user.

20. The apparatus of claim 19, wherein the instructions cause the processor to generate the association data structure associating the first link with the second link based on the relationship measure in response to determining that the probability value is equal to or greater than a predetermined threshold probability value.

21. The apparatus of claim 19, wherein the instructions cause the processor to calculate the probability value by calculating a probability that the second link is a shortened form of the first link that is generated from the first link using a link shortening service.

22. The apparatus of claim 19, wherein the first message information and second message information is received from at least one social networking environment computing device of a social network, and wherein the first and second links are Uniform Resource Locators (URLs) embedded in the first and second messages, respectively, exchanged via the at least one social networking environment computing device.

* * * * *